United States Patent
Tonelli et al.

Patent Number: 6,127,498
Date of Patent: Oct. 3, 2000

[54] MODIFIED HYDROGENATED POLYMERS

[75] Inventors: Claudio Tonelli, Concorezzo; Giovanni Simeone, Solaro; Tania Trombetta, Sovico, all of Italy

[73] Assignee: Ausimont S.p.A., Milan, Italy

[21] Appl. No.: 09/055,325

[22] Filed: Apr. 6, 1998

[30] Foreign Application Priority Data

Apr. 8, 1997 [IT] Italy .................. MI97A0799

[51] Int. Cl.⁷ ............................................ C08F 16/24
[52] U.S. Cl. .................... 526/247; 568/385; 568/614; 568/615; 562/577; 562/583; 562/586; 562/850; 524/462; 524/463; 525/326.2; 525/326.4; 525/539; 525/540; 526/252; 526/255
[58] Field of Search ........................ 568/614, 615, 568/385; 562/577, 583, 586, 850; 524/462, 463; 525/326.2, 326.4, 539, 540; 526/255, 247, 252

[56] References Cited

U.S. PATENT DOCUMENTS

| | | |
|---|---|---|
| 3,250,806 | 5/1966 | Warnell et al. |
| 3,847,978 | 11/1974 | Sianesi et al. |
| 5,228,110 | 7/1993 | Steinbiss |
| 5,258,210 | 11/1993 | Chalfin |
| 5,262,057 | 11/1993 | Tonelli et al. |
| 5,266,650 | 11/1993 | Guerra et al. ............. 525/326.4 |
| 5,384,374 | 1/1995 | Guerra et al. ............. 525/326.4 |
| 5,488,181 | 1/1996 | Marchionni et al. ........... 568/615 |

FOREIGN PATENT DOCUMENTS

| | | |
|---|---|---|
| 0244839 A2 | 11/1987 | European Pat. Off. |
| 0322916 A1 | 7/1989 | European Pat. Off. |
| 0348948 A2 | 1/1990 | European Pat. Off. |
| 0 621 298 A2 | 4/1994 | European Pat. Off. |
| 0654493 A1 | 5/1995 | European Pat. Off. |
| 0712882 A1 | 5/1996 | European Pat. Off. |
| 2148230 | 3/1973 | France |
| MI96A1672 | 2/1996 | Italy |
| 1309402 | 3/1973 | United Kingdom |
| WO 92/12199 | 7/1992 | WIPO |

OTHER PUBLICATIONS

Scicchitano et al, "Synthesis and characterization of low–viscosity Fluoropolyether–based segmented oligomers". Di Angewandte Makromolekulare Chemie, 231 (1995) 47–60 (Nr. 4000).

*Primary Examiner*—Samuel A. Acquah
*Attorney, Agent, or Firm*—Nikaido Marmelstein Murray & Oram, LLP.

[57] ABSTRACT

Hydrogenated fluoromodified polymers obtainable by reaction among hydrogenated polymers and the modifier having a polyether structure:

$$R_fO(CF_2CF_2O)_m(CF_2O)_n\text{—}CF_2\text{—}A_q\text{—}T_p \qquad (I)$$

wherein A is a linking bridge bound to the end group —$CF_2$— of the perfluoropolyether chain, T represents one or more reactive functional groups; p and q are integers, p ranges from 1 to 4, q is an integer from 0 to 1; m and n are integers such that m/n is comprised between 0.2 and 5, Rf is a perfluoroalkyl from 1 to 3 carbon atoms.

19 Claims, No Drawings

MODIFIED HYDROGENATED POLYMERS

The present invention relates to hydrogenated modified polymers with perfluoropolyethers, said polymers can have linear or cured structure, and can be used both as films and as manufactured articles, characterized by improved surface properties with respect both to the corresponding hydrogenated polymers and to the same modified polymers with the fluorinated macromers of the prior art.

More particularly the present invention relates to polymers having an extremely selective enrichment of the fluorinated modifier at the surface which gives an improved hydro/oil-phobicity of the same and specifically an higher contact angle and a lower friction coefficient.

It is known in the art to modify hydrogenated polymeric structures by the use of fluorinated derivatives, in particular having a perfluoropolyether structure, to give good surface properties.

However there was a need to have available extremely effective modifiers allowing, the concentration of the fluorinated modifier being equal, to obtain a higher contact angle and a lower friction coefficient, since, for instance, in the dynamic sealing systems, in particular for hydraulic fluids, the optimal combination of these two properties allows to guarantee an optimal gasket sealing in the time by reducing abrasion and chemical attack phenomena of the same due to the service fluid.

Another example showing a need to have available said modifiers resides in the coating field where the low film thickness often results in an insufficient resistance to the chemical attack due to solvents or aggressive agents generally used as detergents or present in the chemical industry sectors where these films are used as anticorrosion coatings.

At the same time it is also required that the film has a low friction coefficient to reduce the surface abrasion phenomena which determine a lowering of the gloss properties (gloss decrease) and of the imagine definition (D.O.I.) of the films.

It has been unexpectedly and surprisingly found a perfluoropolyether structure modifier able to react by chemically binding to the hydrogenated polymeric structure avoiding undesired release phenomena, in the time, of fluorinated not chemically bound species. In fact the perfluoropolyethers with non reactive end groups, due to the the lack of reactive functional groups, besides not assuring a constancy of the performances in the time, would not be acceptable in applications where release phenomena would cause pollutions of the system in which the film or the polymer is used or absorptions due to biological tissues with non checkable and potentially dangerous effects.

An object of the present invention are hydrogenated fluoromodified polymers obtainable by polycondensation or polyaddition reaction or by grafting among hydrogenated monomeric, oligomeric or polymeric species with the following modifier having a polyether structure:

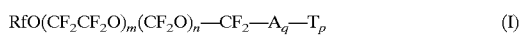   (I)

wherein A is a linking bridge bound to the end group —CF$_2$— of the perfluoropolyether chain, T represents one or more reactive functional groups; p and q are integers, p ranges from 1 to 4, preferably from 1 to 2, q is an integer equal to 0 or 1; m and n are integers such that m/n is comprised between 0.2 and 5, preferably between 1 and 4, m and n are preferably such that the number average molecular weight is comprised between 400 and 5000, preferably between 600 and 2000; Rf is a perfluoroalkyl from 1 to 3 carbon atoms, optionally containing 1 chlorine and/or hydrogen atom.

The linking bridge A is a bivalent radical between the perfluoromethylene group of the fluorinated chain and the T reactive end groups. Preferably it is of linear aliphatic type as —(CH$_2$)$_{m'}$— wherein m' is an integer from 1 to 20; of (alkylen)cycloaliphatic or (alkylen)aromatic type wherein the alkylen has 1 to 20 C atoms, A optionally can contain heteroatoms in the ring or in the alkylene chain, for example N, P, S, O; it can be a polyalkylenoxy, both linear and branched, chain in particular containing repeating units of the type —CH$_2$CH$_2$O—, —CH$_2$CH(CH$_3$)O—, —(CH$_2$)$_3$O—, —(CH$_2$)$_4$O—. The linking bridge A can also contain groups of amidic, ester, ether, COO, sulphur, imine type. A can also be a combination of the indicated types. The number of carbon atoms of the cycloaliphatic compounds being from 3 to 20, for the aromatic ones from 5 to 20.

A can be for instance: —O—, —CR$_a$R$_b$—, —CONR— wherein R$_a$ and R$_b$ equal or different from each other are equal to R; and R is H, alkylic, cycloalipahtic or aromatic groups, all having less than 15 carbon atoms, preferably H or alkylic, —COO—, —COS—, —CO—, an heteroatom, or triazinic, heterocyclic aromatic groups with 5 or 6 atoms containing 2 or more heteroatoms equal to or different from each other, for example N, P, S, O.

T is an end group able to render mono, bi- or polyfunctional the structure, such as to make it reactive towards co-reactants or substrates. The substrates can be both natural and synthetic: paper, cotton, wood, stony materials, polymeric materials, metal or inorganic substrates can be mentioned.

In particular T can be for instance: —OH, —SH, —SR', —NR'$_2$, —COOH, —SiR'$_d$ Q$_{3-d}$, —CN, —NCO, —CH=CH$_2$,

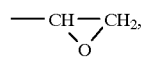

—COR', —OSO$_2$CF$_3$, —OCOCl, —OCN, —N(R')CN, —(O)COC(O)—, —I, —CHO, —CO, —CH(OCH$_3$)$_2$, —SO$_2$Cl, —C(OCH$_3$)=NH, —C(NH$_2$)=NH, —CH(OH)CH$_2$OH, —CH(COOH)$_2$, —CH(COOR')$_2$, —CH(CH$_2$OH)$_2$, —CH(CH$_2$NH$_2$)$_2$, —CH(CN)$_2$, —CH(CH$_2$OCH$_2$CH=CH$_2$)$_2$, wherein R' is an alkylic having from 1 to 20 C atoms, (alkyl)cycloaliphatic or (alkyl) aromatic group having preferably from 5 to 20 C atoms, R' optionally containing fluorine, Q is an —O(CO)$_{d0}$R' group, d is an integer comprised between 0 and 3, d$_0$ is 0 or 1.

The compounds of formula (I) are prepared, for instance, from acids, esters or from acrylic halides of poly (perfluoroalkylenoxides) by known reactions, for instance, according to at indicated in Table I.

| —A—T of formula (I) | Reactant |
|---|---|
| 1  —CONHCH$_2$—CH=CH$_2$ | H$_2$NCH$_2$—CH=CH$_2$ |
| 2  —CONH(CH$_2$)$_3$CO$_2$H | H$_2$N(CH$_2$)$_3$CO$_2$H |
| 3  —CON(CH$_3$)CH$_2$CH$_2$OH | HN(CH$_3$)CH$_2$CH$_2$OH |
| 4  —CONHCH$_2$CH$_2$NH$_2$ | H$_2$NCH$_2$CH$_2$NH$_2$ |
| 5  —CONHCH$_2$CH$_2$SH | H$_2$NCH$_2$CH$_2$SH |
| 6  —CONH(CH$_2$)$_3$Si(OCH$_3$)$_3$ | H$_2$N(CH$_2$)$_3$Si(OCH$_3$)$_3$ |
| 7  —CONH—C$_6$H$_4$—OH (para) | HO—C$_6$H$_4$—NH$_2$ (meta) |
| 8  —CONH—C$_6$H$_4$—CH$_2$CO$_2$H | H$_2$N—C$_6$H$_4$—CH$_2$CO$_2$H |
| 9  —CONH—C$_6$H$_3$(OH)$_2$ | H$_2$N—C$_6$H$_3$(OH)$_2$ |
| 10 —CONH—C$_6$H$_4$—Si(CH$_2$)$_2$OC$_2$H$_5$ | H$_2$N—C$_6$H$_4$—Si(CH$_2$)$_2$OC$_2$H$_5$ |
| 11 —CONH—C$_6$H$_4$—CH$_2$CH=CH$_2$ | H$_2$N—C$_6$H$_4$—CH$_2$CH=CH$_2$ |
| 12 —CONH—C$_6$H$_3$(NCO)(CH$_3$) | OCN—C$_6$H$_3$(NCO)(CH$_3$) |
| 13 —CONH—C$_6$H$_4$—O—C$_6$H$_4$—NCO | OCN—C$_6$H$_4$—O—C$_6$H$_4$—NCO |
| 14 —CONH—C$_6$H$_{10}$—CH$_2$—C$_6$H$_{10}$—NCO | OCN—C$_6$H$_{10}$—CH$_2$—C$_6$H$_{10}$—NCO |
| 15 benzoxazole-5-ol derivative | (1) H$_2$N—C$_6$H$_3$(OH)$_2$ <br> (2) Heating |

-continued

| —A—T of formula (I) | Reactant |
|---|---|
| 16 [structure: methyl-benzimidazole linked to phenyl with two NH₂ groups] | [structure: biphenyl with (1) H₂N, NH₂, NH₂ groups]<br>(2) Heating |
| 17 [structure: methyl-benzothiazole with —CO₂H] | [structure: benzene with (1) H₂N, SH, —CO₂H]<br>(2) Heating |
| 18 [structure: oxadiazole with —C=CH₂ and CH₃] | (1) H₂NNHCOC(CH₃)=CH₂<br>(2) Dehydration |
| 19 —CO₂CH₂C(CH₃)₂CH₂OH | HOCH₂C(CH₃)₂CH₂OH |
| 20 —CO₂CH₂CH(OH)CH₃ | [structure: CH₃CH—CH₂ epoxide] |
| 21 —CO₂CH₂CH=CH₂ | CH₂=CHCH₂OH |
| 22 —CN | (1) NH₃<br>(2) Dehydration |
| 23 [structure: triazine with CH=CH₂ and CF₃ substituents] | (1) NH₃<br>(2) Dehydration<br>(3) $H_2N-\underset{\underset{NH}{\|}}{C}-CF_3$<br>(4) (CH₂=CHCO)₂O |
| 24 —CH₂OH | LiAlH₄ |
| 25 —CH₂OCH₂CH(OH)CH₂OH | Compound 24<br>+ [CH₂—CHCH₂OH epoxide] |
| 26 —CH₂OCH₂CH—CH₂ (epoxide) | Compound 24 + epibromidrine |
| 27 —CH₂OCH₂CH=CH₂ | Compound 24 + CH₂=CHCH₂Br |
| 28 —CH₂OCO—[phenyl with NH₂] | Compound 24<br>+ [structure: benzoxazine-2,4-dione] |
| 29 —CH₂OSO₂CF₃ | Compound 24 + CF₃SO₂F + (C₂H₅)₃N |
| 30 —CH₂OCN | Compound 24 + NCCl + (C₂H₅)₃N |

-continued

| —A—T of formula (I) | Reactant |
|---|---|
| 31 —CH₂O—C₆H₄—NH₂ (para) | (1) Compound 29 + NaO—C₆H₄—NO₂<br>(2) H₂ |
| 32 —CH₂O—C₆H₄—NCO | Compound 31 + phosgene |
| 33 —CH₂O—(phthalic anhydride) | (1) Compound 29 + NaO—C₆H₄(CO₂CH₃)₂<br>(2) Hydrolysis<br>(3) Acetic anhydride |
| 34 —CH₂O—C₆H₄—O—C₆H₄—OCN | (1) Compound 29 + NaO—C₆H₄—O—C₆H₄—OH<br>(2) ClCN + triethylamine |
| 35 —CH₂NH₂ | Compound 29 + NH₃ |
| 36 —CH₂NCO | Compound 35 + COCl₂ |
| 37 —CH₂NHCH₃ | Compound 29 + CH₃NH₂ |
| 38 —CH₂N(norbornene-dicarboximide) | Compound 35 + (norbornene-dicarboxylic anhydride) |
| 39 —CH₂N(norbornane-dicarboximide)—Si(CH₃)₂OCOCH₃ | Compound 38 + HSi(CH₃)₂OCOCH₃ + H₂PtCl₆ |
| 40 —CH₂OCOC(CH₃)=CH₂ | Compound 24 + CH₂=C(CH₃)COCl |
| 41 —CH₂I | Compound 29 + NaI |
| 42 —CH₂SH | (1) Compound 29 + CH₃COSNa<br>(2) Hydrolysis |
| 43 —CH₂N⁺≡C⁻ | (1) Compound 35 + HCO₂CH₃<br>(2) COCl₂ + (C₂H₅)₃N |
| 44 —NCO | (1) NaN₃<br>(2) Heating |
| 45 —COC₆H₅ | Cd(C₆H₅)₂ |
| 46 —C(CH₃)₂OH | (1) CH₃MgBr<br>(2) H⁺ |
| 47 —CHO | LiAlH₄ |
| 48 —C(CH₃)=CH₂ | Compound 46 + P₂O₅ |
| 49 —CH₂N(CN)CH₃ | Compound 37 + ClCN + (C₂H₅)₃N |
| 50 —I | (1) Ag₂O<br>(2) I₂ |
| 51 —CH=CH₂ | Compound 47 + CH₂=P(C₆H₅)₃ |
| 52 —C(OCH₃)=NH | Compound 22 + CH₃OH + (C₂H₅)₃N |
| 53 —CH₂—SO₂Cl | Compound 42 + Cl₂ + H₂O |
| 54 —CH(OCH₃)₂ | Compound 47 + CH₃OH + acido |
| 55 —C(NH₂)=NH | Compound 22 + NH₃ |

-continued

| —A—T of formula (I) | Reactant |
|---|---|
| 56 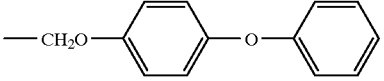 —CH₂O—⟨⟩—O—⟨⟩ | Compound 29 + NaO—⟨⟩—O—⟨⟩ 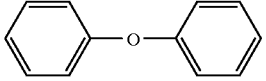 |
| 57 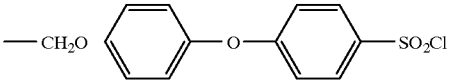 —CH₂O—⟨⟩—O—⟨⟩—SO₂Cl | Compound 56 + ClSO₃H |
| 58 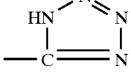 HN–N=N / —C=N | Compound 22 + HN₃ |

The fluorinated modifiers of the invention are generally used from 100 ppm to 10% by weight, these not being absolute but only indicative limits and the skilled will choose then the optimal amount to obtain the performances indicated above combined with the specific properties of the single base hydrogenated polymers.

A further object of the present invention is represented by both the modifiers as such and the process for obtaining them.

The Applicant has indeed surprisingly found a process which allows to prepare the modifiers of the invention in an extremely selective way and with an high yield.

The preparation process of the modifiers of the invention of formula (I) comprises the following steps:

synthesis of the raw peroxidic material by reaction of tetrafluoroethylene with oxygen in absence of UV radiations and in the preence of radical initiators;

reduction of the raw peroxidic material to obtain perfluoropolyethers free from peroxidic groups and containing chains with —COF end groups and such that the functionality of the obtained product is lower than 1.8;

esterification of the —COF groups by reaction with alcohols to obtain the —COOR' end groups;

chemical reduction of the esters to alcohols —CH₂OH;

separation of the monofunctional species —CH₂OH from the reaction mixture by an adsorption/de-adsorption process on stationary phases;

optional transformation of the —CH₂OH end groups in other functional groups to obtain —A—T of formula (I).

The process comprises the preparation of peroxidic perfluoropolyethers, the end groups of the perfluoropolyether can contain 1 chlorine and/or hydrogen atom, by reacting tetrafluoroethylene with oxygen in liquid phase at temperatures lower than 50° C. and in the presence of one or more initiators having 1 or more F—X₁ bonds, wherein X₁ is selected from fluorine, oxygen and chlorine, the compounds having the F—O bond are selected from the organic compounds containing 1 or more fluoroxy groups. This first reaction step is described in U.S. Pat. No. 5,228, 110 herein incorporated by reference.

The raw peroxidic perfluoropolyethers are subjected to a reduction treatment to eliminate the peroxidic bonds transforming them into functional groups —COF. This reaction step is carried out for instance by utilizing the processes described in U.S. Pat. No. 3,847,978 herein incorporated by reference. In particular the reduction is carried out with hydrogen in the presence of a palladium catalyst on a carbon support, the amount of palladium being about 1% based on the support.

The raw peroxidic material obtained in the first reaction step must be such as to bring to products having —COF functionality lower than 1.8, preferably lower than or equal to 1.55, to obtain high yields in pure monofunctional product.

The acylic fluorides thus obtained are esterified with hydrogenated or fluorinated alcohols, for instance according to U.S. Pat. No. 3,847,978. Specifically a direct esterification is carried out with alcohols from 1 to 6 carbon atoms. The obtained product with functionality $COOR'_a$, wherein $R'_a$ is the alkylic part of the used alcohol, has an average functionality almost corresponding to that of the previous acylic derivative before esterification.

The subsequent ester reduction step to obtain the corresponding alcohol is preferably carried out with sodium-boronhydride. The obtained alcoholic functionality is about the one corresponding to the above acylic fluoride.

The product thus obtained is then subjected to a separation/purification process based on the selective adsorption/de-adsorption of the monofunctional species present in the mixture by using stationary phases able to have a different bond strength with the species having a different alcoholic functionality present in the mixture. The separation process is preferably carried out according to U.S. Pat. No. 5,262,057, herein incorporated by reference, or according to the Italian Patent MI96A001672 in the name of the Applicant. Specifically it is used, as stationary phase, silica in a chromatographic column and subsequent elution processes with solvents having eluotropic progressively increasing strength, or in a batch process with stirred reactor and subsequent filtration. The chromatographic separation process is preferably carried out by using silica, previously washed with methanol, dried at 150° C. The mixture of perfluoropolyethers having alcoholic functionality is passed through the column, optionally the mixture is diluted with the non polar eluent itself, and it is eluted with non polar solvents characterized by an eluotropic strength epsilon lower than 0.05 referred to the silica, preferably selected from trichlorotrifluoroethane, perfluoropolyethers having low molecular weight and low viscosity lacking of functional groups, perfluoroalkanes mono- and dihydroperfluoropolyethers with low molecular weight and low viscosity, hydrochlorofluorocarbons H(C)FC, fluoroaromatics selected from trifluorotoluene, bis-trifluoromethylbenzene isomers, perfluorobenzene. The first eluted fraction is formed by all the perfluoropolyethers lacking of alcoholic functional groups and by smaller amounts of monofunctional products. The subsequent fractions only contain the monofunctional products wherein the functionality generally ranges between 0.97 and 1.03, preferably 0.98 and 1.02. Generally, if a product having an average functionality 1.5 in acylic fluoride is considered, the first fraction is lower than 5% by weight, the useful subsequent fractions are about the 40–50% by weight based on the raw alcoholic mixture.

The monofunctional product —$CH_2OH$ is then, optionally, tansformed according to the above reactions to obtain other functional groups —A—T of formula (I) suitable to react with the various hydrogenated co-reactants, hydrogenated polymers containing reactive functional groups to give the modified polymers of the invention. In the case of substrates, natural or synthetic, depending on the reactive group of the substrate the above reaction can take place. When the substrate has no reactive groups towards T of the modifier, the modifier is adsorbed on the surface through hydrogen bonds or Van der Vaal forces. In this case this phenomenon is indicated in this application as adsorption of the modifier on the surface.

For illustrative purpose two classes of polymeric materials have been selected: polyurethanes and polyacrylates belonging respectively to the thermoprocessable elastomers and to the cured films family, to show the advantages obtainable with the modifiers of the invention compared with the corresponding non modified polymeric materials or modified with fluorinated bifunctional or monofunctional modifiers of the art. Unexpectedly it was found that the modification with the derivatives of formula (I) of the present invention not only shows advantages with respect to the non modified polymer but also with respect to the monofunctional perfluoropolyethers known in the art having a similar structure and also with respect to the products having the same sequences of the modifiers of formula (I) but containing two functional groups on both chain end groups (Rf of formula (I) is equal to the functional group —A—T). This property combination—lower friction coefficient and high contact angles—allows to obtain improved surface properties as it is requested in the above application fields.

The obtainment of the hydrogenated fluoromodified polymers of the present invention can be achieved by means of processes well known in the art, such as, for instance, polycondensation, polyaddition, grafting reactions.

The following examples are given for illustrative but not limitative purposes of the present invention.

EXAMPLE 1
Preparation of the Raw Material Having Alcoholic Functionality

EXAMPLE 1A
Preparation of the Peroxidic Perfluoropolyether

Example 6 of U.S. Pat. No. 5,258,210 was repeated but using an amount of $CF_3OF$ (Nl/h of 0.25) obtaining a raw peroxidic material characterized by:
  a) number average molecular weight (PM) 3700, and oxidizing power (PO) 2.94.

Example 7 of U.S. Pat. No. 5,258,210 was repeated using an initiator F amount of 0.18 Nl/h and using a TFE amount of 1 Nl and an oxygen amount of 5 Nl/h obtaining a product having the following characteristics:
  b) number average molecular weight (PM) 1620, and oxidizing power (PO) 1.27.

EXAMPLE 1B
Catalytic Hydrogenation

Catalytic reduction of the raw peroxidic materials a) and b) of Example 1A is carried out by means of Example 10 of U.S. Pat. No. 3,847,978 to obtain acid fluoride (the subsequent hydrolysis treatment with 40% sulphoric acid is not carried out).

The following acid fluorides are respectively obtained:
  a) PM 720 (equivalent weight PE 470); average functionality: 1.53
  b) PM 709 (equivalent weight PE 627); average functionality: 1.13

EXAMPLE 1C
Esterification

The acid fluorides a) and b) of Example 1B are transformed into the respective methyl esters by reaction at room temperature with methanol and elimination of the developed HF by stripping at 70° C. by nitrogen stream. The following methylic esters are obtained (as widely described in the art, for instance also in the previous Patent):

| | |
|---|---|
| a) PM 737 (PE 485) | average functionality: 1.52 |
| b) PM 730 (PE 658) | average functionality: 1.11 |

EXAMPLE 1D
Reduction with $NaBH_4$

The products obtained in Example 1C are subjected to reduction with $NaBH_4$ in ethanol and subsequent acid hydrolysis of the intermediate boric esters allowing to obtain the corresponding alcoholic derivatives:

| | |
|---|---|
| a) PM 811 (PE 539) | average functionality: 1.50 |
| b) PM 800 (PE 728) | average functionality: 1.10 |

EXAMPLE 1E
Chromatographic Purification

The product obtained in Example 1D was separated by chromatography by using a silica column (3.3 Kg), 1 Kg of ZDOL having an average functionality of 1.50 (product a) of Example 1D), and limiting the pretreatment of the column only to the washing with CFC-113. The elution is carried out with the use of only the solvent with low polarity CFC-113 to separate the neutral and monofunctional fractions.

In particular a first elution with 85 l of CFC-113 and a subsequent elution with 43 l of a mixture of CFC-113/methanol (9/1) allow to collect the following fractions (of which also the NMR analysis is reported):

| Fraction | Eluent | Amount (g) | MW | EW | Aver. Funct. |
|---|---|---|---|---|---|
| 1. | 113 | 35 | 1810 | 6530 | 0.23 |
| 2. | 113 | 107 | 1309 | 1330 | 0.98 |
| 3. | 113 | 316 | 924 | 892 | 1.02 |
| 4. | 113/$CH_3OH$ | 497 | 699 | 370 | 1.88 |

EXAMPLE 2
Synthesis of the Carboxylic Monoacid

In a 250 ml glass flask equipped with condenser, mechanical stirrer and thermometer, containing a solution of $K_2Cr_2O_7$, $H_2SO_4$ and $H_2O$ (16.6 g, 35.5 g and 25.4 g respectively), maintained at 80° C., 50 g of Z monoalcohol are added in 1 hour, obtained according to the previous Example, (fraction 3, EW 892, equal to 56 meq).

The reaction mass is maintained at 80° C. for 4 hours, then is poured into 2.5 l of water. 2 extractions with 500 ml each of H-GALDEN are carried out. The aqueous phase is treated with 500 ml of isopropanol and then extracted with 500 ml of H-GALDEN.

The solutions containing H-GALDEN are put together, treated with sodium sulphate, filtered and the solvent evaporated.

47 g of product are recovered which at the N.M.R. and I.R. analyses result to be the corresponding carboxylic monoacid (yield 95%).

EXAMPLE 3
Synthesis of the Methyl Monoester

In a 250 ml glass flask equipped with condenser, thermometer and mechanical stirrer, 40 g of carboxylic monoacid (acid equivalent weight 910, equal to 44 meq acid) prepared according to the previous Example, are introduced.

100 ml of anhydrous methanol containing 1 g of dissolved HCl are added. Then the reaction mass is reflux heated, then it is let under reflux for three hours, it is cooled at room temperature and the upper methanol phase is separated, then the methanol dissolved in the product is removed by distillation and 40 g of product are separated which at the NMR and IR analyses result to be the corresponding methyl ester.

EXAMPLE 4
Functionalization of the Z Monoalcohol Derivative to Obtain the Corresponding Diolic Derivative (the two OH end groups are on the same group A)

With the purpose to obtain a bifunctional derivative, i.e. suitable to be used as reactive additive for polymeric materials and lacking of undesired effects typical of a monofunctional reactive additive (for instance the termination of the growing polymeric chain), 15 g of mono-ol Z fraction 3 (partially salified with K terbutylate, 5%) are reacted with glycidol in terbutanol at 80° C. (according to what is described in the literature, for instance in Die Angewandete Makromolekulare Chemie, 231, 47 (1995)). A diolic derivative having a PFPE chain and the two reactive groups on the same chain end group is thus obtained; this allows to obtain a reactive additive able to give chain-extension (without therefore reducing the length of the growing molecular chain) and to have however a free PFPE part:

$RfO(CF_2CF_2O)_m(CF_2O)_n\text{—}CF_2CH_2OCH_2CH(OH)CH_2(OH)$ wherein the m and n indexes are integers such as to give a number average molecular weight of the fluorinated chain of 860, and the m/n ratio is 2.

EXAMPLE 5
Synthesis of Z-urethan-methacrylate

The mono-ol Z (fraction 3) is reacted with ethylisocyanate methacrylate (EIM) in CFC-113 containing some drops of DBTDL as catalyst, the reaction is completed at 50° C. in 8 hours.

A macromeric derivative having a segmented structure is thus obtained which consists of one part containing PFPE sequences and of another methacrylic hydrogenated part (suitable therefore for a subsequent UV or peroxidic curing with unsaturated hydrogenated reactants):

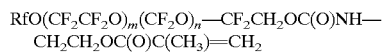

$RfO(CF_2CF_2O)_m(CF_2O)_n\text{—}CF_2CH_2OC(O)NH\text{—}CH_2CH_2OC(O)C(CH_3)\!\!=\!\!CH_2$

EXAMPLE 6 (comparative)

Example 1 was repeated to obtain a perfluoropolyether monoalcohol having a mono Y structure:

$RfO(C_3F_6O)_r(CF_2O)_tCF_2CH_2OH$ wherein the r, t indexes are integers such as to give a number average molecular weight of 800, the r/t ratio is 40, Rf has the above meaning, using perfluoropropene instead of tetrafluoroethylene in Example 1A.

The corresponding diol was then prepared according to the procedure indicated in Example 4.

EXAMPLE 7 (comparative)

a1) Reference Hydrogenated PU

According to the details described in EP 621,298 an hydrogenated polyurethane polymer is prepared by means of a two steps process which includes in a first phase the synthesis of the NCO ended prepolymer and in a subsequent phase the chain-extension and press polymerization, starting from:

| polycaprolactone diol | (PCL) | 1 eq. |
| --- | --- | --- |
| methylendiphenylendiisocyanate | (MDI) | 2.5 eq. |
| hydroquinoneethoxylate | (HQE) | 1.5 eq. |

EXAMPLE 8 b1) PU Additivated with Z Diol (from monoalcohol) of Example 1

To the NCO ended prepolymer synthetized as in the previous Example the derivative obtained by reaction between the mono Z and the glycidol (1% w/w based on the total amount), obtained according to Example 4, is added.

It is allowed to react for 1 hour at 90° C. and then the chain-extension with HQE and the polymerization are completed as in the previous case.

EXAMPLE 9 (comparative)

c1) PU Additivated with Y Diol (from monoalcohol) According to Example 6

To the NCO ended prepolymer synthetized as in the previous Example the derivative obtained by reaction between the mono Y and the glycidol (1% w/w based on the total amount), obtained according to the details described in Example 6, is added.

It is allowed to react for 1 hour at 90° C. and then the chain-extension with HQE and the polymerization are completed as in the previous case.

On the three polymeric materials thus synthetized, the hardness, the friction coefficient and the surface energy by contact angles were determined, the results can be summarized as follows:

TABLE 1

| Material | Hardness Shore A | Friction coeff. 2.01N | Friction coeff. 7.01N | Surface energy mN/m |
|---|---|---|---|---|
| a1) (cfr.) | 87 | 0.63 | 0.46 | 30.05 |
| b1) | 87 | 0.35 | 0.24 | 16.3 |
| c1) (cfr.) | 87 | 1.60 | 1.35 | 17.4 |

EXAMPLE 10
Preparation of Cured Films

Mixtures containing bisphenol A-dihydroxyethylacrylate and variable amounts of Z urethanmethacrylate (0–1% w/w) are deposited on a glass plate and cured by UV radiation in the presence of a photo-initiator (e.g. 2,2-dimethoxy-2-phenylacetophenone) under nitrogen atmosphere.

On the so obtained films the advancing contact angle is determined with bidistilled water, the results can thus be summarized and compared with those of similar films obtained from Z bis-urethanmethacrylate additives synthetized starting from fluorinated diols having a different number average molecular weight (1000 and 2000).

Contact angle measurements were performed with a Kruss G1 instrument and with a Chan balance, DCA 322.

The measurements with the Wilhelmy plate method were made in air at room temperature (20° C.) according to that reported in Journal of Colloid and Interface Science 172, 48–55 (1995) A. Mennella and N. R. Morrow.

On every sample at least 6 measurements were performed; the difference from the average value was no more than 2° for the advancing angle.

TABLE 2

| Composition | Mono Z advancing contact angle with H$_2$O | | Bis Z-1000 | | Bis Z-2000 | |
|---|---|---|---|---|---|---|
| % PFPE w/w | air | glass | air | glass | air | glass |
| 0 | 70 | 65 | 70 | 65 | 70 | 65 |
| 0.01 | 78 | 55 | 77 | 70 | 76 | 72 |
| 0.05 | 120 | 56 | 98 | 68 | 85 | 77 |
| 0.10 | 127 | 62 | 104 | 69 | 94 | 81 |
| 0.40 | 124 | 62 | 104 | 70 | 98 | 84 |
| 0.80 | 126 | 75 | 105 | 70 | 100 | 85 |
| 100.00 | / | / | 124 | 106 | 127 | 112 |

From analysis data reported in Table 2 it is evident how films obtained with mono Z, for any concentration value of the fluorinated modifier, always give the highest values of the advancing contact angle (air side). Besides these highest values are achieved even at very low concentrations (0.05%); this confirms the greater efficacy of mono Z in giving hydro/oil-phobicity to the film surface with respect to the other comparison PFPE modifiers.

We claim:

1. Hydrogenated fluoromodified polymers obtainable by polycondensation or polyaddition or grafting reaction among hydrogenated monomeric, oligomeric or polymeric species, with the following modifier having a polyether structure:

$$RfO(CF_2CF_2O)_m(CF_2O)_n\text{—}CF_2\text{—}A_q\text{—}T_p \qquad (I)$$

wherein A is a linking bridge bound to the end group —CF$_2$— of the perfluoropolyether chain, T represents one or more reactive functional groups; p and q are integers, p ranges from 1 to 4, q is an integer 0 or 1; m and n are integers and the ratio of m/n is comprised between 0.2 and 5, the number average molecular weight is comprised between 400 and 5000, Rf is a perfluoroalkyl from 1 to 3 carbon atoms, optionally containing 1 chlorine and/or hydrogen atom.

2. Hydrogenated fluoromodified polymers according to claim 1 wherein the linking bridge A is a linking bivalent radical between the perfluoromethylene group of the fluorinated chain and the reactive end groups T; of (alkylen)cycloaliphatic, (alkylen) aromatic, A optionally contains heteroatoms in the ring or in the alkylene chain, it is a polyalkylenoxy both linear and branched chain, containing repeating units of the type —CH$_2$CH$_2$O—, —CH$_2$CH(CH$_3$)O—, —(CH$_2$)$_3$O—, —(CH$_2$)$_4$O—, the linking bridge A optionally containing groups of amidic, ester, ether, COO, sulphur, imine type, the number of carbon atoms of the cycloaliphatic compounds being from 3 to 20 and of the aromatic from 5 to 20; optionally the group A is also a combination of the indicated types.

3. Hydrogenated fluoromodified polymers according to claim 1 wherein the bond group of A with the perfluoromethylene group of the fluorinated chain is selected from the group consisting of —O—, —CR$_a$R$_b$—, —CONR—, wherein R$_a$ and R$_b$ equal or different from each other are equal to R (R being H, alkylic, cycloalipahtic or aromatic groups having less than 15 carbon atoms), —COO—, —COS—, —CO—, a heteroatom, triazinic, heterocyclic aromatic groups with 5 or 6 atoms containing 2 or more heteroatoms equal to or different from each other.

4. Hydrogenated fluoromodified polymers according to claim 1 wherein T is an end group able to render mono, bi- or polyfunctional the structure, making it reactive towards co-reactants or substrates.

5. Hydrogenated fluoromodified polymers according to claim 4, wherein T is selected from the group consisting of: —OH, —SH, —SR', —NR'$_2$, —COOH, —SiR'$_d$Q$_{3-d}$, —CN, —NCO, —CH=CH$_2$, —COR', —OSO$_2$CF$_3$, —OCOCl, —OCN,

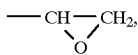

—N(R')CN, —(O)COC(O)—, I, —CHO, —CO, —CH(OCH$_3$)$_2$, —SO$_2$Cl, —C(OCH$_3$)=NH, —C(NH$_2$)=NH, —CH(OH)CH$_2$OH, —CH(COOH)$_2$, —CH(COOR')$_2$, —CH(CH$_2$OH)$_2$, —CH(CH$_2$NH$_2$)$_2$, —CH(CN)$_2$, and —CH(CH$_2$OCH$_2$CH=CH$_2$)$_2$, wherein R' is an alkylic, cycloaliphatic or aromatic group, R' optionally containing fluorine, Q is an —O(CO)$_{do}$R' wherein do is 0 or 1; d is an integer comprised between 0 and 3.

6. Hydrogenated fluoromodified polymers according to claim 1 wherein the fluorinated modifiers are from 100 ppm to 10% by weight of the hydrogenated polymer or of the substrate.

7. Modifiers of formula (I) according to claim 1.

8. Process for preparing modifiers of formula (1) according to claim 7 comprising the following steps:

synthesizing raw peroxidic material by reacting tetrafluoroethylene and oxygen in absence of UV radiation and in the presence of radical initiators;

reducing the raw peroxidic material to obtain perfluoropolyethers lacking peroxidic groups and containing chains with end groups —COF and a functionality of the resultant product is less than 1.8;

esterifying the —COF groups by reacting said —COF groups with alcohols to obtain the end groups —COOR';

chemically reducing the esters with alcohols —CH$_2$OH;

separating the monofunctional species —CH$_2$OH from the reaction mixture by an adsorbing/desorbing process on stationary phases;

optionally transforming the end groups —CH$_2$OH into other functional groups to obtain —A—T of formula (I).

9. Process according to claim 8 wherein the peroxidic perfluoropolyether, the end groups of the perfluoropolyether contains 1 chlorine and/or hydrogen atom, is obtained by reacting tetrafluoroethylene with oxygen in liquid phase at temperatures lower than 50° C. and in the presence of one or more initiators having 1 or more F—X$_1$ bonds, wherein X$_1$ is selected from the group consisting of fluorine, oxygen and chlorine.

10. Process according to claim 9 wherein the compounds having the F—O bond are compounds containing 1 or more fluoroxy groups.

11. Process according to claim 8 wherein the separation of the monofunctional species is carried out by a chromatographic separation process wherein as stationary phase silica is used in a chromatographic column eluted with solvents having a progressively increasing eluotropic strength.

12. Process according to claim 8, wherein the separation of the monofunctional species is carried out in a batch process with a stirred reactor and subsequent filtration.

13. Manufactured articles produced by treating a natural or synthetic substrate with the modifier according to claim 7.

14. Manufactured articles according to claim 13 wherein the substrate contains chemically reactive groups towards the T end groups of the modifier.

15. Manufactured articles according to claim 13 wherein the modifier is absorbed on the substrate surface.

16. Reacting monomers, oligomers or polymers with modifiers of formula (I) to prepare hydrogenated fluoromodified polymers according to claim 1.

17. Use of hydrogenated fluoromodified polymers according to claim 1 for hydraulic sealing systems.

18. Hydrogenated fluoromodified polymers according to claim 1 wherein p ranges from 1 to 2, the ratio of m/n is comprised between 1 and 4, and the number average molecular weight is comprised between 600 and 2000.

19. Hydrogenated fluoromodified polymers according to claim 2 wherein the linking bivalent radical is a linear aliphatic moiety, —(CH$_2$)$_{m'}$—, wherein m' is an integer from 1 to 20 optionally containing heteroatoms selected from the group consisting of being N, P, S and O.

* * * * *